United States Patent
Christfort (10) Patent No.: US 9,977,469 B2
(45) Date of Patent: May 22, 2018

(54) MODULAR COMPUTING NODE

(71) Applicant: Ranch Systems LLC, Novato, CA (US)

(72) Inventor: Jacob Christen Christfort, Novato, CA (US)

(73) Assignee: RANCH SYSTEMS LLC, Novato, CA (US)

( * ) Notice: Subject to any disclaimer, the term of this patent is extended or adjusted under 35 U.S.C. 154(b) by 129 days.

(21) Appl. No.: 15/058,715

(22) Filed: Mar. 2, 2016

(65) Prior Publication Data
US 2016/0259376 A1    Sep. 8, 2016

Related U.S. Application Data

(60) Provisional application No. 62/128,365, filed on Mar. 4, 2015, provisional application No. 62/261,705, filed on Dec. 1, 2015.

(51) Int. Cl.
*G06F 1/16* (2006.01)

(52) U.S. Cl.
CPC .......... *G06F 1/1656* (2013.01); *G06F 1/1635* (2013.01)

(58) Field of Classification Search
CPC .............................. G06F 1/1637; G06F 1/1635
See application file for complete search history.

(56) References Cited

U.S. PATENT DOCUMENTS

| | | | | |
|---|---|---|---|---|
| 2001/0034502 | A1* | 10/2001 | Moberg | A61M 5/1456 604/154 |
| 2005/0044764 | A1* | 3/2005 | Decker | G09F 23/00 40/645 |
| 2007/0026371 | A1* | 2/2007 | Wood | G09B 5/062 434/317 |
| 2007/0138275 | A1 | 6/2007 | Hall | |
| 2009/0201270 | A1* | 8/2009 | Pikkujamsa | G06F 1/1626 345/184 |
| 2010/0043870 | A1* | 2/2010 | Bennett | H02S 40/34 136/251 |
| 2013/0084919 | A1* | 4/2013 | Glynn | H04B 1/3833 455/566 |

* cited by examiner

*Primary Examiner* — Shaheda Abdin
(74) *Attorney, Agent, or Firm* — Hickman Palermo Becker Bingham LLP (57) ABSTRACT

Techniques related to a modular computing node are disclosed. The modular computing node includes at least a first unit. The first unit includes a memory and one or more processors that execute instructions stored in the memory. The one or more processors are powered by electricity that is converted from solar energy captured by a tubular solar panel. A first interface of the first unit includes one or more first electrical contacts. The first interface forms a watertight seal with a second interface of a second unit based on a twisting motion. Furthermore, a signal bus is formed based on the twisting motion based on aligning the one or more first electrical contacts with one or more second electrical contacts of the second interface.

18 Claims, 10 Drawing Sheets

MODULAR COMPUTING NODE

CROSS-REFERENCE TO RELATED APPLICATIONS; BENEFIT CLAIM

This application claims the benefit of U.S. Provisional Application No. 62/128,365, filed Mar. 4, 2015, and U.S. Provisional Application No. 62/261,705, filed Dec. 1, 2015, the entire contents of each of which is hereby incorporated by reference as if fully set forth herein. The applicant(s) hereby rescind any disclaimer of claim scope in the parent application(s) or the prosecution history thereof and advise the USPTO that the claims in this application may be broader than any claim in the parent application(s).

FIELD OF THE DISCLOSURE ve a top in relate to the Internet of Things (IoT) and more specifically, to a modular modular computing node.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The IoT is expanding to include non-traditional computing devices that are deployed in an outdoor environment. For example, computing devices can be deployed in an agricultural setting to monitor soil moisture and to control irrigation. However, such computing devices are subject to prolonged exposure to the outdoor environment with little, if any, interaction with people. Thus, such computing devices are typically environmentally rugged and power self-sufficient. Unfortunately, environmental ruggedness and power self-sufficiency typically involve a trade off in terms of high cost and/or limited functionality that hinder adoption of outdoor computing technology.

Outdoor computing devices can cost more than indoor computing devices for reasons related to environmental ruggedness and/or power self-sufficiency. An environmentally rugged design can involve integrated user interfaces that avoid exposing ports and/or connectors to the outdoor environment while risking obsolescence when more user interfaces are needed. For example, when a display or keypad is needed, an outdoor computing device without such user interfaces is subject to complete replacement, which can be a costly solution. Maintenance expenses can significantly increase ownership costs while limiting power self-sufficiency. For example, using battery-powered computing devices typically involves the cost and inconvenience of replacing depleted batteries on a regular basis. Using alternative power sources can involve relatively expensive components that are difficult to install properly. For example, using solar-powered computing devices typically involves specialized mounting equipment and knowledge to properly install solar panels that face the equator at a slanted angle.

Functionality can also be limited by environmental ruggedness and/or power self-sufficiency constraints. Power consumption typically increases with quantity and quality of user interfaces, ports, and/or connectors. Modularity offers some mitigation of cost and power concerns but can continue to be limited in functionality due to environmental ruggedness concerns. For example, a low-cost modular solution can offer a variety of sensors but continue to offer a limited number of ports in order to avoid exposing unused ports to the outdoor environment.

Thus, there is a need for an environmentally rugged and power self-sufficient design that is sensitive to cost and that overcomes the aforementioned limitations on functionality.

While each of the drawing figures depicts a particular embodiment for purposes of depicting a clear example, other embodiments may omit, add to, reorder, and/or modify any of the elements shown in the drawing figures. For purposes of depicting clear examples, one or more figures may be described with reference to one or more other figures, but using the particular arrangement depicted in the one or more other figures is not required in other embodiments.

DETAILED DESCRIPTION

In the following description, for the purposes of explanation, numerous specific details are set forth in order to provide a thorough understanding of the present disclosure. It will be apparent, however, that the present disclosure may be practiced without these specific details. In other instances, well-known structures and devices are shown in block diagram form in order to avoid unnecessarily obscuring the present disclosure. Modifiers such as "first" and "second" may be used to differentiate elements, but the modifiers do not necessarily indicate any particular order. For example, a second unit may be so named although, in reality, it may correspond to a first, second, and/or third unit.

General Overview

A modular computing node includes one or more units. A first unit includes at least a central processing unit (CPU). In some example embodiments, the first unit further includes one or more antennas, a modem, a radio, a battery, a solar panel, a display, a wireless receiver, and/or an accelerometer. In some example embodiments, the modular computing node is at least partly cylindrical, and the solar panel has a tubular shape. The first unit is powered by electricity that is converted from solar energy.

In some example embodiments, the modular computing node includes one or more expansion units, such as a second unit. The second unit can include one or more antennas, a modem, a radio, a battery, a solar panel, a display, a wireless receiver, an accelerometer, a sensor, and/or a controller. A first interface of the first unit and a second interface of the second unit can form a watertight seal based on a twisting motion. The twisting motion aligns one or more first electrical contacts of the first interface with one or more second electrical contacts of the second interface to form a signal bus.

Network Topology

Figure 1:
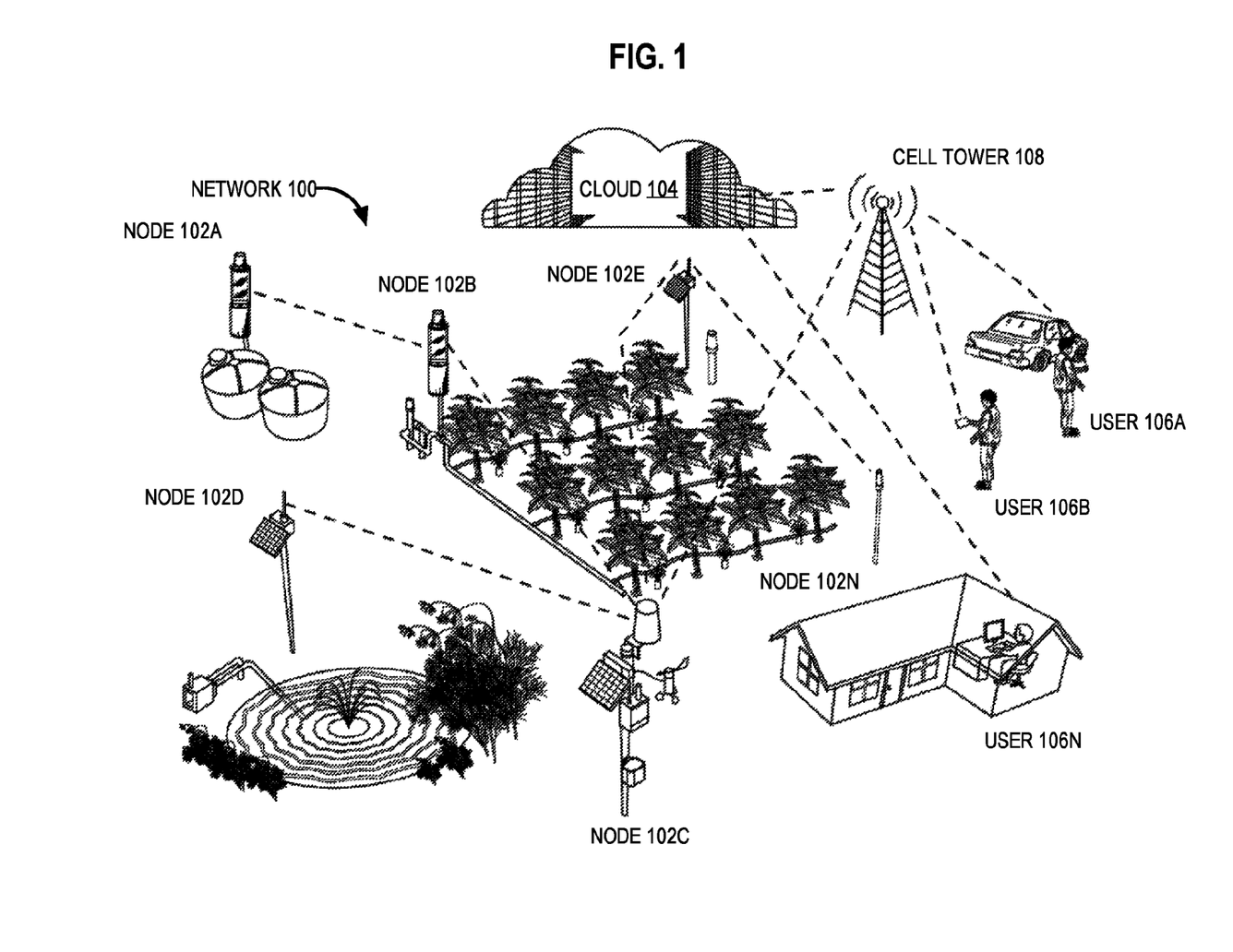
FIG. 1 depicts an example computer architecture on which embodiments may be implemented.

FIG. 1 depicts an example computer architecture on which embodiments may be implemented. Referring to FIG. 1, network 100 includes nodes 102A-N (the label "N" in "102N," and in any other reference numeral herein, connotes that any number of items can be present or used in embodiments, as in "1 to n items"). Cloud 104 communicates with network 100 and client devices associated with users 106A-N. Cloud 104 communicates with users 106A-B via cell tower 108.

Network 100 can include one or more wireless personal area networks (WPANs), local area networks (LANs), wide area networks (WANs), and/or any other group of nodes 102A-N. Nodes 102A-N can include network devices, such as routers or base stations, as well as network hosts, such as computing devices equipped with sensors or controllers. Network 100 can support one or more network topologies, such as a star topology and/or a mesh topology. For example, node 102A can communicate directly with node 102B via a mesh network. Additionally or alternatively, node 102A can communicate indirectly with node 102B via a base station, such as node 102C.

Network 100 can communicate with the Internet, cloud 104, and/or any other network in any of a number of different ways. For example, any of nodes 102A-N can communicate with cloud 104 via a direct link to cell tower 108. Additionally or alternatively, any of nodes 102A-N can communicate with cloud 104 via a direct link to a base station that has a direct link to cell tower 108 and/or cloud 104. Additionally or alternatively, any of nodes 102A-N can communicate with cloud 104 via multiple hops to a base station.

In the example of FIG. 1, network 100 is related to agricultural telemetry. Node 102A can be equipped with a controller that operates a water valve at a water silo, and node 102B can be equipped with a sensor that detects soil moisture levels at an irrigation pipe. In FIG. 1, node 102A communicates directly with node 102B via a mesh network. However, in some example embodiments, node 102A can communicate indirectly with node 102B via cloud 104 and/or a base station, such as node 102C.

Cloud 104 can include one or more server computers, load balancers, data centers, and/or any other Internet-based computing resource. In some example embodiments, cloud 104 can host a cloud application that provides a user interface for managing network 100. Any of users 106A-N can access the cloud application via a client device, such as a desktop computer, a smartphone, a tablet computer, etc.

In the example of FIG. 1, users 106A-N can access any of nodes 102A-N via cloud 104 and/or cell tower 108. However, in some example embodiments, any of nodes 102A-N can be deployed without access to a network. In other words, any of nodes 102A-N can be deployed as a standalone device. For example, any of nodes 102A-N can log data that is retrieved later via a near-field communication (NFC) protocol, such as Bluetooth.

Computing Node

Figure 2:
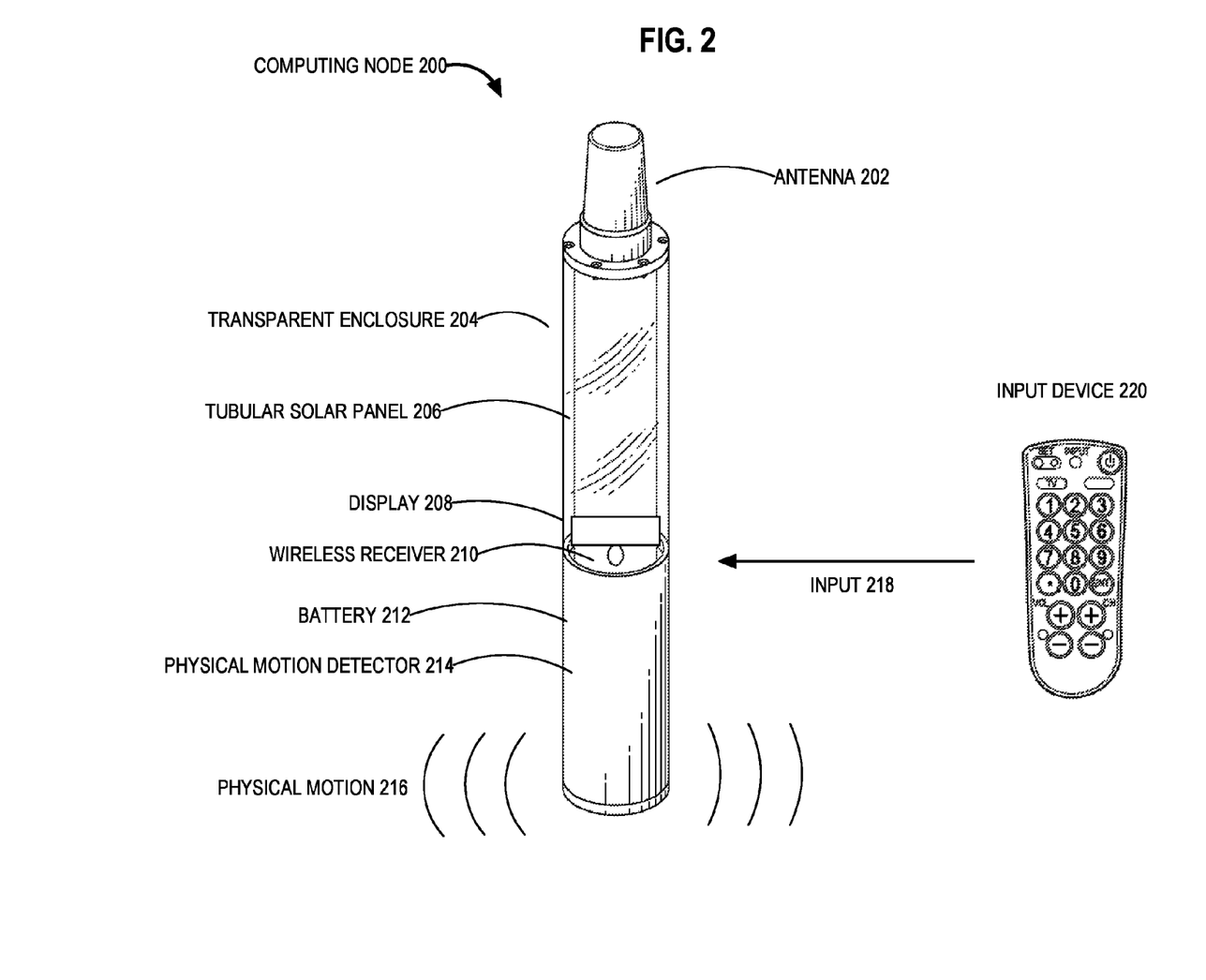
FIG. 2 depicts an example computing node.

Any of nodes 102A-N can be a computing node. FIG. 2 depicts an example computing node. Referring to FIG. 2, computing node 200 includes antenna 202, transparent enclosure 204, tubular solar panel 206, display 208, wireless receiver 210, battery 212, and physical motion detector 214. Computing node 200 receives input 218 from input device 220. In FIG. 2, computing node 200 is subject to physical motion 216.

Data Processing

Computing node 200 can be any device that includes a memory and one or more processors that execute instructions stored in the memory. The memory can be a solid-state drive (SSD), a flash program memory, a random-access memory (RAM), and/or any other volatile or non-volatile memory. The one or more processors can have a reduced instruction set computing (RISC) architecture or a complex instruction set computing (CISC) architecture. For example, the one or more processors can include an Advanced RISC Machine (ARM) processor.

In some example embodiments, a microcontroller can include the memory and the one or more processors on an integrated circuit. For example, a single integrated circuit can include a central processing unit (CPU) and memory. Furthermore, the microcontroller can include an analog-to-digital converter (ADC). The ADC converts, into a digital format, analog signals received via one or more antennas of computing node 200.

Wireless Communications

Whether used as a standalone device or as part of a network 100, computing node 200 includes one or more antennas that enable wireless communications with other devices. For example, computing node 200 can include an antenna 202 that enables data communication via a NFC protocol. Additionally or alternatively, computing node 200 can include at least one antenna enabling computing node 200 to operate as a radio node that communicates with the Internet. For example, computing node 200 can include a cellular communications antenna and/or a mesh networking radio antenna. When computing node 200 includes multiple antennas, a particular antenna can be designated as providing a primary mode of communication, and a different antenna can be designated as providing a secondary mode of communication. For example, a cellular communications antenna can provide a primary mode of communication, and a mesh networking radio antenna can be used as a failover.

In some example embodiments, the one or more antennas are included in a top portion of computing node 200. Advantageously, a higher location for the one or more antennas can contribute to improved wireless radio performance. As mentioned above, computing node 200 can include at least one antenna that enables communication with the Internet. As such, computing node 200 can also include at least one modem, such as a cellular modem. In some example embodiments, any modems can also be included in the top portion of computing node 200.

Electrical Power

In some example embodiments, computing node 200 can be powered by solar energy. Advantageously, renewable energy sources, such as solar energy, provide at least a degree of autonomy to computing devices. Thus, there is a lower cost of maintaining such computing devices.

In some example embodiments, computing node 200 can be powered by solar energy harvested via tubular solar panel 206. Advantageously, tubular solar panel 206 includes one or more solar panels that are arranged in a 360-degree fashion enabling sunlight to be captured from any direction. Furthermore, tubular solar panel 206 enables a nearly vertical orientation that facilitates installation, thereby reducing installation costs.

Although a slanted equator-facing orientation can provide more solar power in most sunlit conditions, tubular solar panel 206 can provide nearly as much solar power in some of the most challenging circumstances. For example, in far northern locations, a nearly vertical orientation is optimal, because the sun is low on the horizon. Furthermore, in overcast conditions, tubular solar panel 206 enables sunlight to be profitably absorbed from all directions. Advantageously, designing computing node 200 for the most challenging circumstances enables computing node 200 to work in any other circumstances. In other words, a vertical orientation ensures that adequate solar energy is collected in the most challenging circumstances, such as in winter conditions, while enabling a surplus of solar energy to be collected in less challenging circumstances, such as in summer conditions for which a slanted orientation is optimal.

In some example embodiments, computing node 200 can include tubing that has a cylindrical shape similar to that of tubular solar panel 206. At least a portion of the tubing can be transparent enclosure 204 for tubular solar panel 206. Transparent enclosure 204 can be a rugged enclosure that protects tubular solar panel 206 and can be made of glass, clear UV-rated acrylic, or any other transparent material. Thus, transparent enclosure 204 allows sunlight to pass through to tubular solar panel 206. The tubing can also include a portion that houses one or more batteries and electronics. This portion can be made of a non-transparent material, such as anodized aluminum. Typically, computing node 200 is made of materials that are of high quality relative to cost, such as materials that are manufactured at very high volumes for a variety of uses in society.

In some example embodiments, tubular solar panel 206 is housed in a middle portion of computing node 200, and a bottom portion houses battery 212. Battery 212 can be a rechargeable battery, such as a lithium-ion battery, that can provide an alternate power supply for computing node 200. A maximum power point tracking (MDPT) charger can cause some power collected from tubular solar panel 206 to be stored in battery 212.

User Interface

In some example embodiments, computing node 200 can include display 208 that outputs data to a user. For example, display 208 can be a liquid crystal display (LCD) or any other low-power display hardware. Display 208 can be visible through transparent enclosure 204 and can itself be made of a UV-resistant material. In some example embodiments, display 208 can be mounted on a printed circuit board (PCB) that is also connected to one or more batteries and electronics, thereby minimizing incremental cost. For example, display 208 can be placed at the topmost part of a PCB that is connected to one or more batteries and electronics at a bottom part of the PCB. Thus, if the one or more batteries and electronics are housed in a bottom portion of computing node 200, display 208 can be visible through a lower part of transparent enclosure 204. In some example embodiments, an "awning effect" can be created to protect display 208 from becoming unreadable in the sun due to heat. For example, the "awning effect" can be created based on placing a non-transparent material, such as a round foil insert, along an inner surface of transparent enclosure 204. Thus, a non-transparent part of transparent enclosure 204 can provide shade for display 208, which is typically set back from transparent enclosure 204.

In some example embodiments, computing node 200 can include wireless receiver 210 that receives input 218 transmitted from a user via input device 220. Wireless receiver 210 can be an infrared (IR) receiver or any other hardware that can receive and decode wireless signals. Wireless receiver 210 can be visible through transparent enclosure 204. In some example embodiments, wireless receiver 210 can be mounted on a PCB next to display 208. Input device 220 can be an IR remote control, a wireless keyboard and/or mouse, or any other device that can transmit input 218 as a wireless signal. For example, input device 220 can be a standard television remote control that communicates with wireless receiver 210 via IR signals. Such remote controls are available at a marginal cost and can be purchased separately from computing node 200.

If display 208 and/or wireless receiver 210 are constantly powered on, tubular solar panel 206 would be impractically large in some example embodiments. Furthermore, display 208 and wireless receiver 210 are typically used for installation and occasional maintenance tasks. Thus, to avoid unnecessary power consumption, computing node 200 can be configured so that display 208 and/or wireless receiver 210 are powered off in their normal states. Additionally or alternatively, wireless receiver 210 can be powered on periodically, such as every five to ten seconds. Thus, wireless receiver 210 can periodically check for input 218, and in response to detecting input 218, wireless receiver 210 can cause display 208 to be powered on.

In some example embodiments, computing node 200 can include physical motion detector 214, such as an accelerometer, that causes display 208 and/or wireless receiver 210 to power on based on detecting physical motion 216 of computing node 200. Physical motion detector 214 consumes little power to monitor physical impact, such as a shaking motion or a tapping motion, on computing node 200. Upon detecting physical motion 216, physical motion detector 214 activates display 208 and/or wireless receiver 210 for interaction with a user. For example, the user can be an installation technician who shakes computing node 200 and enters configuration parameters via input device 220 when prompted to do so on display 208. After a period of inactivity, display 208 and/or wireless receiver 210 revert to a powered-off state.

Physical motion detector 214 can be mounted on the PCB that houses display 208 and/or wireless receiver 210, thereby minimizing incremental cost. In the example of FIG. 2, physical motion detector 214 is housed in a non-transparent bottom portion of computing node 200 along with battery 212.

Modular Computing Nodes

Figure 3A:
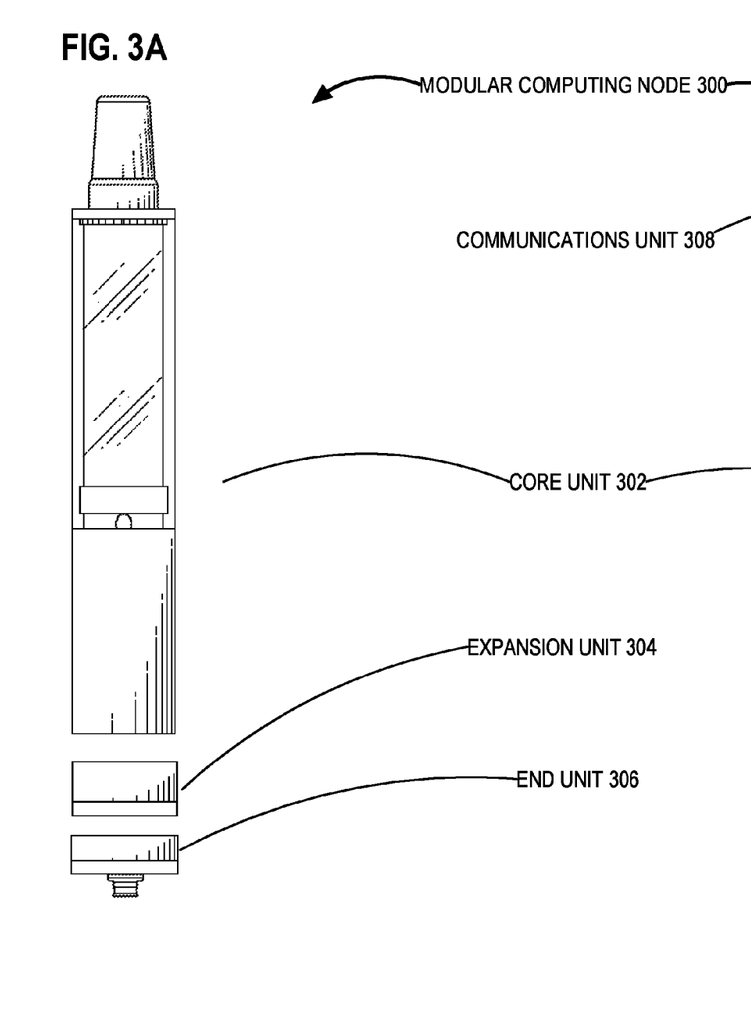
FIGS. 3A-B depict example modular computing nodes.
Figure 3B:
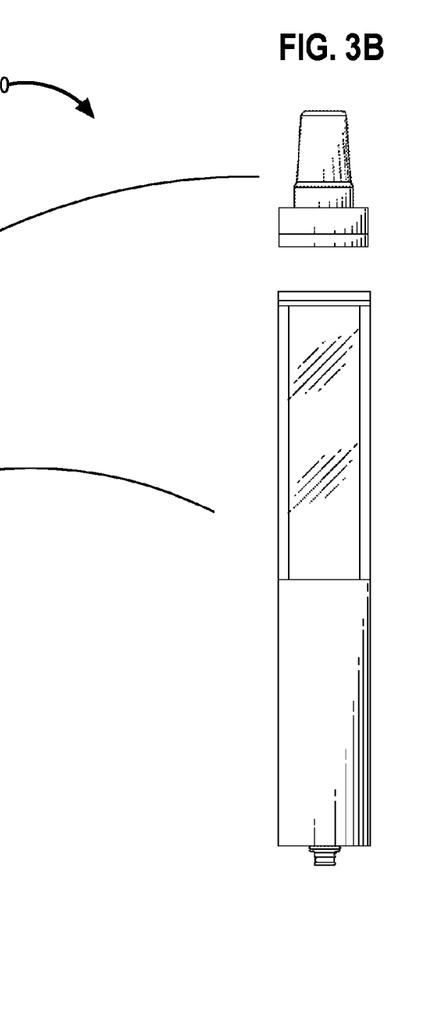

Ownership costs associated with computing node 200 can be further reduced based on a modular design. Advantageously, modular computing nodes enable a consumer to purchase only those components that the consumer needs and to customize the modular computing nodes to suit every need of the consumer. FIGS. 3A-B depict example modular computing nodes.

Referring to FIG. 3A, modular computing node 300 includes core unit 302. Modular computing node 300 can be expanded to include expansion unit 304 and end unit 306.

In the example of FIG. 3A, core unit 302 is a cylindrical component that can include one or more antennas, one or more optional modems/radios, a tubular solar panel 206, a transparent enclosure 204, a CPU, a battery 212, a display 208, a wireless receiver 210, and/or a physical motion detector 214. Modular computing node 300 can be vertically expanded in a downward direction based on attaching expansion unit 304 to core unit 302. Modular computing node 300 can be further expanded based on attaching yet another expansion unit and/or end unit 306 to expansion unit 304.

Expansion unit 304 can include any of a variety of auxiliary hardware, such as any of the following items:
- any of a variety of sensors including a temperature sensor, a relative humidity sensor, a barometer, and/or any other climate sensor;
- a camera, such as a digital camera that is able to pan nearly 360 degrees through a glass line in expansion unit 304;
- exposed connectors, such as connectors that can be used to attach expansion unit 304 to a remote sensor;
- radio transceivers that enable communication with other devices, such as via a Modbus protocol;
- any of a variety of controllers, such as a direct current (DC) latching valve and/or a relay switch;
- extra memory storage;
- extra solar panels;
- extra battery capacity;
- a linear extender that includes a top portion and a bottom portion connected with a length of wire that can be used to increase a distance separating core unit 302 from a particular expansion unit. For example, the linear extender can enable core unit 302 to be placed at a high location while a sensor remains near ground level.

Typically, expansion unit 304 includes a top interface and a bottom interface. The top interface can be used to attach expansion unit 304 to core unit 302 or another expansion unit. The bottom interface can be used to attach expansion unit 304 to another expansion unit or end unit 306. End unit 306 can be a particular type of expansion unit 304 that includes a plug to protect a bottom interface of core unit 302 or another expansion unit.

Referring to FIG. 3B, modular computing node 300 includes core unit 302, which does not include an antenna. Instead, modular computing node 300 can be expanded to include communications unit 308.

In the example of FIG. 3B, core unit 302 can include a tubular solar panel 206, a transparent enclosure 204, a CPU, a battery 212, a display 208, a wireless receiver 210, and/or a physical motion detector 214. Modular computing node 300 can be vertically expanded in an upward direction based on attaching communication unit 308 to core unit 302.

Communication unit 308 can be a particular type of expansion unit 304 that can include one or more antennas and one or more optional modems/radios. In other words, a variety of different communication units can offer a variety of different communication options. Advantageously, a separate communication unit enables customizing modular computing node 300 to exclude any antennas and/or modems that are unsuitable for a particular network.

In some example embodiments, modularity can be taken even further. For example, core unit 302 can include a CPU, and a variety of expansion units can include a variety of other hardware. Thus, a battery unit can include battery 212, a solar unit can include tubular solar panel 206, etc. Advantageously, further modularity provides further hardware options. For example, different battery units can include different types and/or different sizes of batteries, and different solar units can include different types and/or different sizes of solar panels.

Expanding a Modular Computing Node

Figure 4:
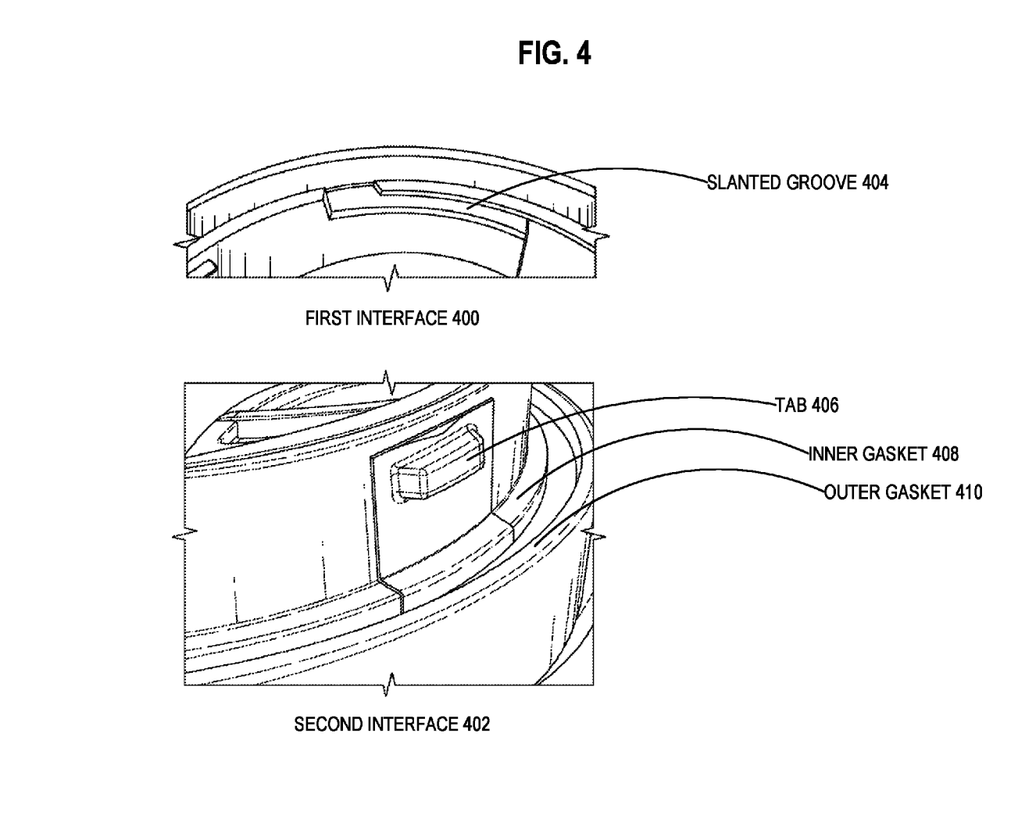
FIG. 4 depicts an example pair of interfaces.

Expanding modular computing node 300 involves matching a top interface with a bottom interface. FIG. 4 depicts an example pair of interfaces. Referring to FIG. 4, first interface 400 includes slanted groove 404. Second interface 402 includes tab 406, inner gasket 408, and outer gasket 410.

First interface 400 can be a top interface and/or a bottom interface of core unit 302 and/or any of a variety of expansion units. Likewise, second interface 402 can be a top interface and/or a bottom interface of core unit 302 and/or any of a variety of expansion units. First interface 400 and second interface 402 interlock based on an expansion threading that includes slanted groove 404 in first interface 400 and tab 406 in second interface 402. Tab 406 fits into an opening of slanted groove 404 and slides along slanted groove 406 when first interface 400 and/or second interface 402 are turned like the top of a travel mug. Slanted groove 406 is angled such that as tab 406 slides along slanted groove 406, a distance between first interface 400 and second interface 402 decreases.

In some example embodiments, one or more gaskets, such as O-rings, form a watertight seal between first interface 400 and second interface 402. In the example of FIG. 4, slanted groove 404 is located on a thread wall of first interface 400. The thread wall fits between inner gasket 408 and outer gasket 410 of second interface 402.

Figure 5:
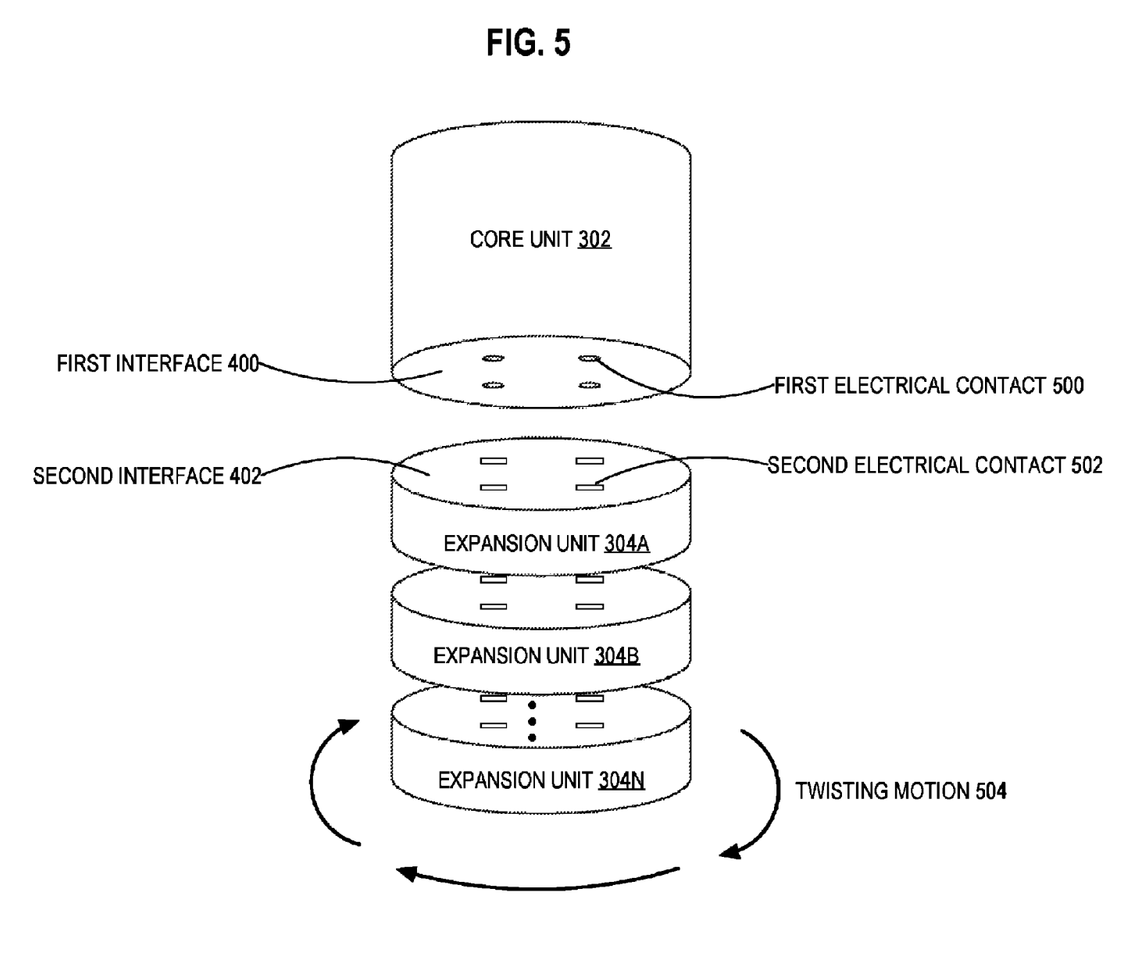
FIG. 5 depicts an example signal bus.

Modular computing node 300 can include a signal bus that runs vertically inside core unit 302 and any expansion units. Expanding modular computing node 300 involves extending the signal bus based on matching a pair of interfaces. FIG. 5 depicts an example signal bus. Referring to FIG. 5, first interface 400 of core unit 302 includes first electrical contact 500. Second interface 402 of expansion unit 304A includes second electrical contact 502. Expansion unit 304A is connected to core unit 302 based on twisting motion 504.

In the example of FIG. 5, first interface 400 is a bottom interface that includes a number of embedded studs, such as first electrical contact 500. In some example embodiments, the bottom interface can expose four metal studs, which carry power signals and communications signals. Two studs can carry the power signals, one of which is positive while another is negative. Another two studs can carry the communications signals. For example, the communications signals can be signals A and B of an RS-485 protocol or clock and data signals of an inter-integrated circuit (I2C) protocol.

In the example of FIG. 5, second interface 402 is a top interface that includes a number of mating springs, such as second electrical contact 502. Each mating spring aligns with a respective stud as first interface 400 is connected to second interface 402 based on twisting motion 504. For example, twisting motion 504 can be an eighth of a clockwise turn. Based on aligning studs with mating springs, a signal bus of core unit 302 can be extended with a signal bus of expansion unit 304A.

As depicted in FIG. 5, a virtually limitless plurality of stackable expansion units 304A-N can be used to expand below core unit 302 like LEGO blocks. Each expansion unit can have a top interface that includes mating springs and a bottom interface that includes studs. For example, expansion unit 304A can have a third interface with third electrical contacts that mate with fourth electrical contacts of a fourth interface of expansion unit 304B.

Similarly, one or more expansion units, such as communication unit 308, can be used to expand above core unit 302. Thus, core unit 302 can have a top interface that includes mating springs corresponding to studs in a bottom interface of communication unit 308.

In some example embodiments, each expansion unit is associated with a unit serial number. Core unit 302 can automatically discover unit serial numbers when the signal bus is extended. Thus, each expansion unit can be automatically configured to operate with core unit 302 based on a distinct serial number.

Mounting a Modular Computing Node

Figure 6:
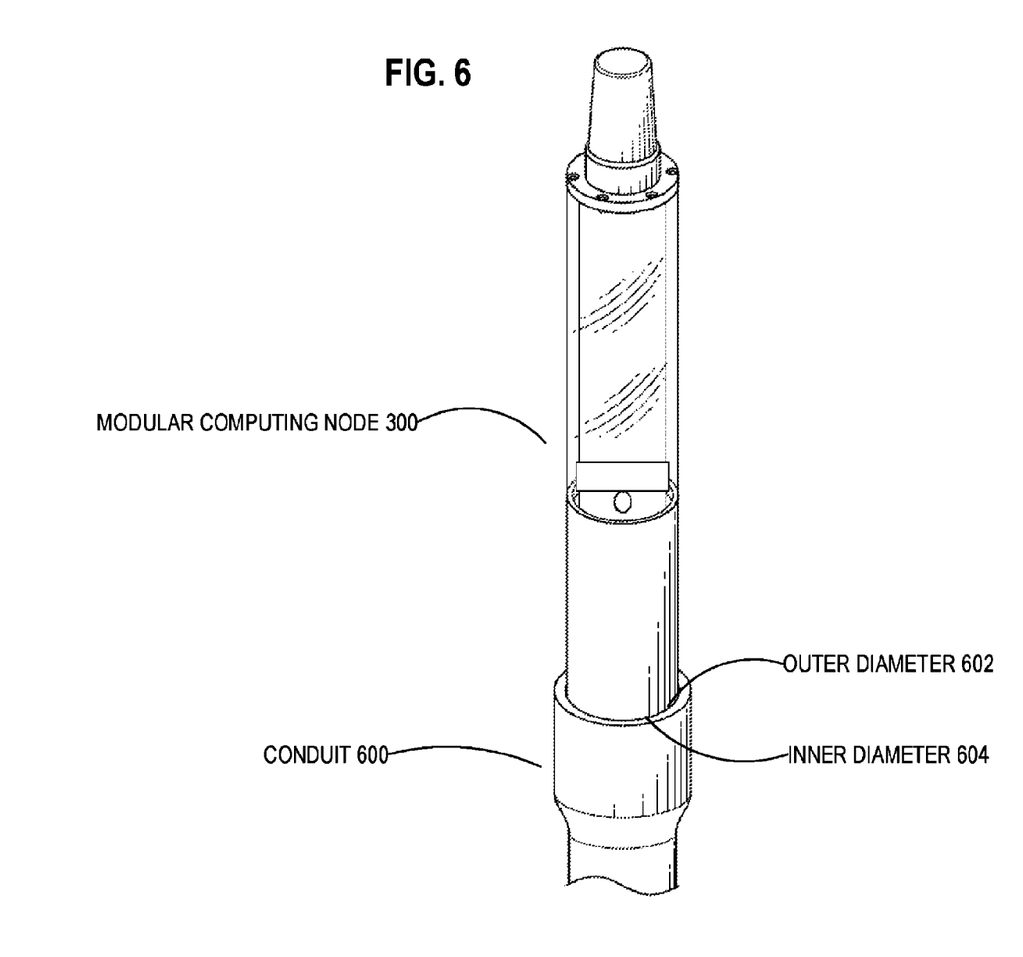
FIG. 6 depicts an approach for mounting a modular computing node in a conduit.

As mentioned above, modular computing node 300 can have a cylindrical shape. Further reduction in installation costs can be achieved based on the cylindrical shape. More specifically, the cylindrical shape is well-suited for mounting modular computing node 300 in a conduit. FIG. 6 depicts an approach for mounting modular computing node 300 in a conduit. Referring to FIG. 6, outer diameter 602 of modular computing node 300 fits within inner diameter 604 of conduit 600.

Conduit 600 can be made of polyvinyl chloride (PVC) or any other commonly available pipe material. In some example embodiments, conduit 600 can provide a support structure for modular computing node 300. For example, conduit 600 can be a 20-foot schedule 80 PVC pipe that has a bell end with inner diameter 604 of 2.5 inches. Modular computing node 300 can include a bottom portion with outer diameter 602 that closely matches inner diameter 604, thereby allowing at least the bottom portion to fit snugly within conduit 600. Conduit 600 can be inserted into a post hole in the ground or attached to a post or any other support structure. Furthermore, conduit 600 can protect any wires extending from the bottom portion based on routing the wires inside conduit 600. Conduit 600 itself can be modular and include various fittings for any of a variety of mechanical needs.

Figure 7:
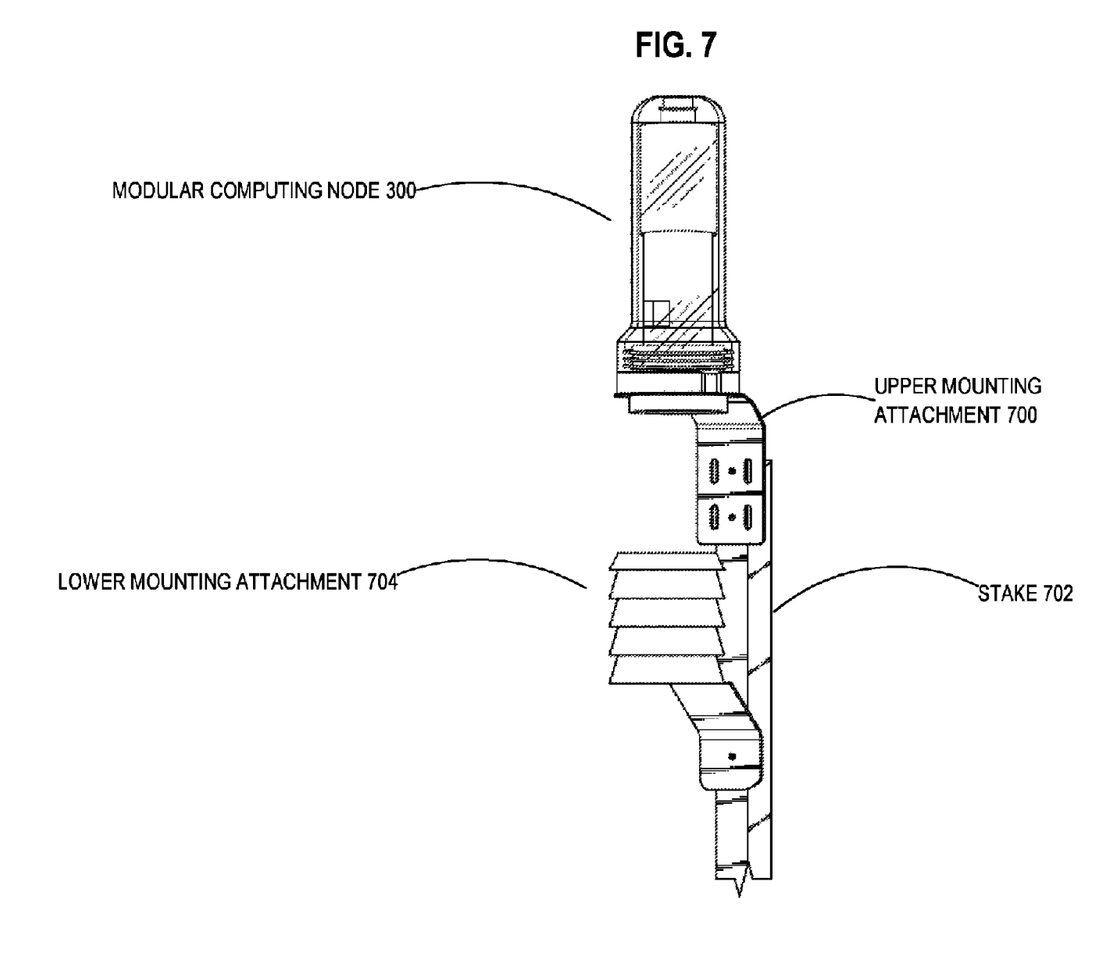
FIG. 7 depicts an approach for mounting a modular computing node using a universal bracket.

Alternatively, modular computing node 300 can be attached to a post or any other support structure using something other than conduit 600. FIG. 7 depicts an approach for mounting modular computing node 300 using a universal bracket. Referring to FIG. 7, modular computing node 300 is attached to stake 702 via upper mounting attachment 700. Lower mounting attachment 704 is also attached to stake 702.

Stake 702 can be a post or any other support structure, such as a slotted metal frame. One or more mounting attachments can be affixed to stake 702 to provide support for modular computing node 300. In some example embodiments, upper mounting attachment 700 can be a universal bracket with a circular opening through which at least a portion of modular computing node 300 can be inserted. Upper mounting attachment 700 supports at least core unit 302.

Optional lower mounting attachment 704 can support one or more expansion units. In some example embodiments, lower mounting attachment 704 can serve as a radiation shield. For example, a temperature sensor and/or a relative humidity sensor can be inserted in lower mounting attachment 704 to be shielded from the sun. In some example embodiments, lower mounting attachment 704 can be a particular type of expansion unit 304. In other words, lower mounting attachment 704 can be unattached to stake 702.

Instead, lower mounting attachment 704 can have be integrated into modular computing node 300 based on twisting motion 504.

Figure 8:
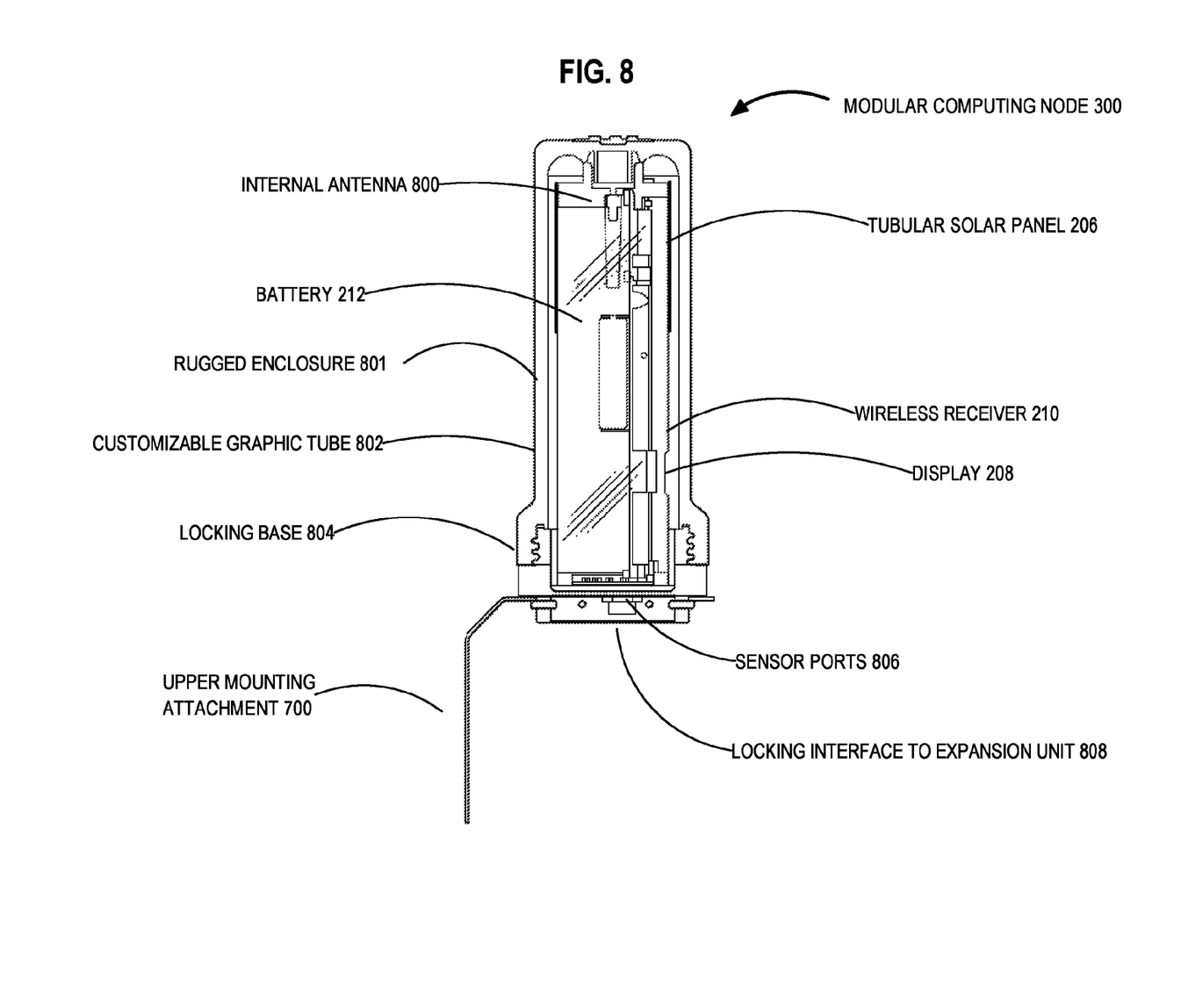
FIG. 8 depicts a detailed view of a node-bracket assembly, in an example embodiment.

FIG. 8 provides a detailed view of an example node-bracket assembly. Referring to FIG. 8, upper mounting attachment 700 supports modular computing node 300 that includes internal antenna 800, tubular solar panel 206, battery 212, rugged enclosure 801, wireless receiver 210, display 208, customizable graphic tube 802, locking base 804, sensor ports 806, and locking interface to expansion unit 808.

Modular computing node 300 of FIG. 8 is structured somewhat differently from modular computing node 300 of FIGS. 3A-B. In the example of FIG. 8, rugged enclosure 801 covers nearly all of core unit 302. In some example embodiments, rugged enclosure 801 is transparent in its entirety. For example, like transparent enclosure 204, rugged enclosure 801 can be made of glass, clear UV-rated acrylic, or any other transparent material that allows sunlight to pass through to tubular solar panel 206. At a minimum, however, rugged enclosure 801 is transparent at least where it covers tubular solar panel 206 and/or display 208. Rugged enclosure 801 is replaceable and can be secured to upper mounting attachment 700 via locking base 804. For example, locking base 804 can include a screw thread that interfaces with a corresponding screw thread of rugged enclosure 801. Instead of having antenna 202 located above tubular solar panel 206, internal antenna 800 is surrounded by tubular solar panel 206. Furthermore, battery 212 is housed in a middle portion of modular computing node 300 above display 208. Thus, battery 212 is connected to an upper part of a PCB that houses, in a lower part, wireless receiver 210 and display 208.

Sensor ports 806 include electrical contacts that extend a signal bus when modular computing node 300 is expanded to include one or more expansion units. The one or more expansion units are connected to core unit 302 via locking interface to expansion unit 808. At least a portion of the one or more expansion units can be supported inside a circular opening of lower mounting attachment 704.

Process Overview

Figure 9:
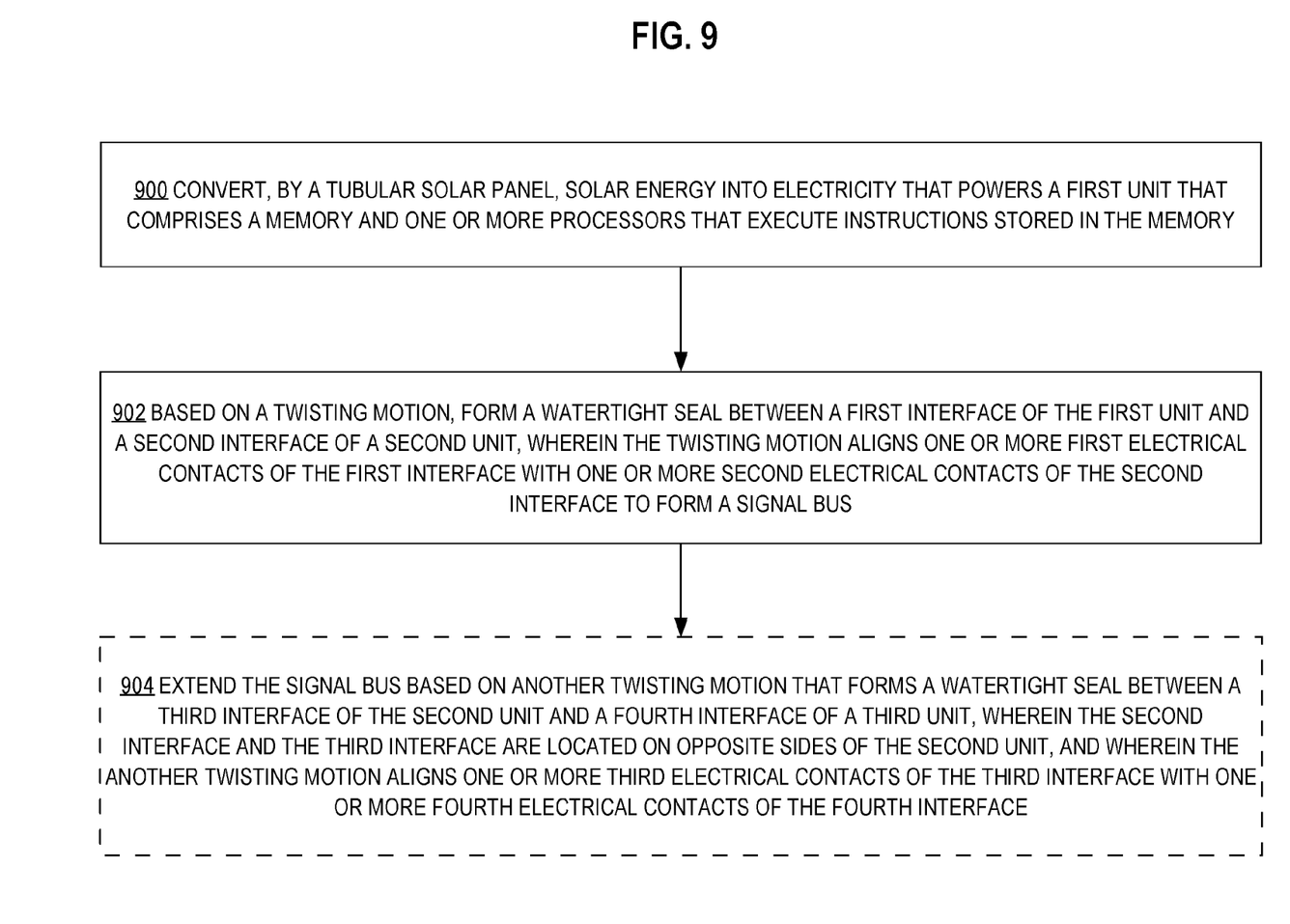
FIG. 9 is a flow diagram that depicts an approach for using a modular computing node.

FIG. 9 is a flow diagram that depicts an approach for using a modular computing node. At block 900, tubular solar panel 206 of modular computing node 300 converts solar energy into electricity. The electricity powers a first unit, such as core unit 302, that includes a memory and one or more processors that execute instructions stored in the memory.

At block 902, a watertight seal is formed between first interface 400 of the first unit and second interface 402 of a second unit, such as expansion unit 304, based on twisting motion 504. Twisting motion 504 aligns one or more first electrical contacts of first interface 400 with one or more second electrical contacts of second interface 402 to form a signal bus.

At optional block 904, the signal bus can be extended based on another twisting motion that forms a watertight seal between a third interface of the second unit and a fourth interface of a third unit, such as another expansion unit. Second interface 402 and the third interface are located on opposite sides of the second unit. The another twisting motion aligns one or more third electrical contacts of the third interface with one or more fourth electrical contacts of the fourth interface.

Any part of the approach depicted in FIG. 9 can be repeated to add any number of expansion units to modular computing node 300.

Implementation Examples

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 10:
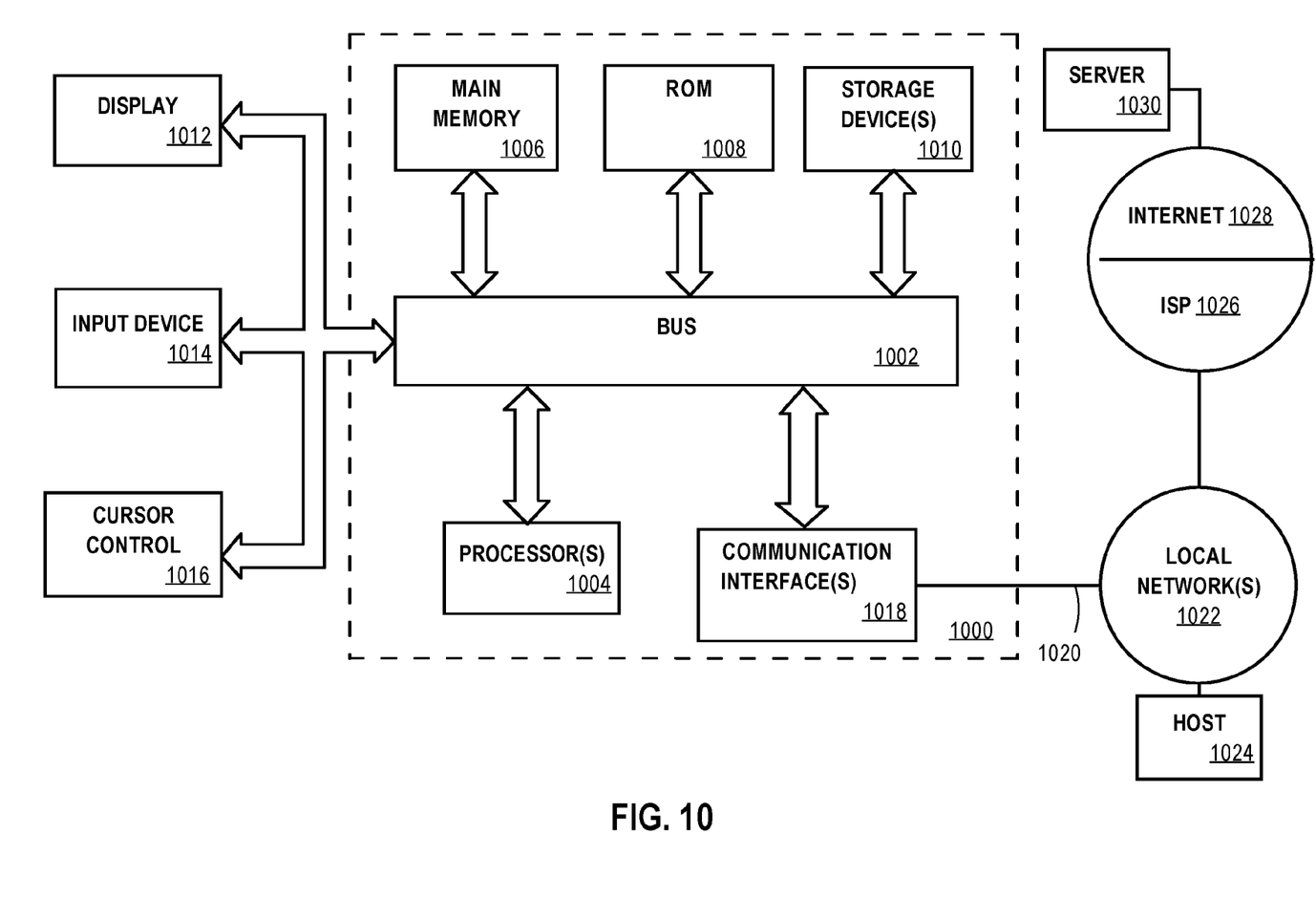
FIG. 10 depicts a computer system upon which an embodiment may be implemented.

For example, FIG. 10 is a block diagram that depicts a computer system 1000 upon which an embodiment may be implemented. Computer system 1000 includes a bus 1002 or other communication mechanism for communicating information, and a hardware processor 1004 coupled with bus 1002 for processing information. Hardware processor 1004 may be, for example, a general purpose microprocessor.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A system comprising:
    a first unit that comprises a memory and one or more processors that execute instructions stored in the memory;
    wherein the one or more processors are powered by electricity that is converted from solar energy captured by a tubular solar panel;
    a first interface of the first unit, wherein the first interface forms a watertight seal with a second interface of a second unit based on a twisting motion that aligns one or more first electrical contacts of the first interface with one or more second electrical contacts of the second interface to form a signal bus;
    wherein:
        the second unit further comprises a third interface,
        the second interface and the third interface are located on opposite sides of the second unit, and
        the third interface forms a watertight seal with a fourth interface of a third unit based on a twisting motion that aligns one or more third electrical contacts of the third interface with one or more fourth electrical contacts of the fourth interface to extend the signal bus.

2. The system of claim 1, wherein the first unit further comprises:
    a display that communicates information to a user; and
    a wireless receiver that accepts input from the user.

3. The system of claim 2, wherein the first unit further comprises a physical motion detector that activates the display and the wireless receiver based on detecting a physical motion of the first unit.

4. The system of claim 1, wherein the first unit is at least partly cylindrical such that an outer diameter of the first unit matches an inner diameter of a conduit in which the first unit is placed.

5. The system of claim 1, wherein the second unit is at least partly cylindrical such that an outer diameter of the second unit matches an inner diameter of a conduit in which the second unit is placed.

6. The system of claim 1, wherein the first unit further comprises the tubular solar panel.

7. The system of claim 1, wherein the second unit comprises the tubular solar panel.

8. The system of claim 1, wherein the first unit further comprises one or more antennas.

9. The system of claim 1, wherein the second unit comprises one or more antennas.

10. A method comprising:
    converting, by a tubular solar panel, solar energy into electricity that powers a first unit that comprises:
        a memory, and
        one or more processors that execute instructions stored in the memory;
    based on a twisting motion, forming a watertight seal between a first interface of the first unit and a second interface of a second unit;
    wherein the twisting motion aligns one or more first electrical contacts of the first interface with one or more second electrical contacts of the second interface to form a signal bus,
    wherein:
        the second unit further comprises a third interface;
        the second interface and the third interface are located on opposite sides of the second unit; and
        the method further comprises, in response to a twisting motion that aligns one or more third electrical contacts of the third interface with one or more fourth electrical contacts of a fourth interface of a third unit:
            extending the signal bus; and
            forming a watertight seal between the third interface and the fourth interface of the third unit.

11. The method of claim 10, wherein the first unit further comprises:
    a display that communicates information to a user; and
    a wireless receiver that accepts input from the user.

12. The method of claim 11, further comprising:
    detecting a physical motion of the first unit using a physical motion detector operatively coupled to the first unit; and
    in response to detecting the physical motion, activating the display and the wireless receiver.

13. The method of claim 10, wherein the first unit is at least partly cylindrical such that an outer diameter of the first unit matches an inner diameter of a conduit in which the first unit is placed.

14. The method of claim 10, wherein the second unit is at least partly cylindrical such that an outer diameter of the second unit matches an inner diameter of a conduit in which the second unit is placed.

15. The method of claim 10, wherein the first unit further comprises the tubular solar panel.

16. The method of claim 10, wherein the second unit comprises the tubular solar panel.

17. The method of claim 10, wherein the first unit further comprises one or more antennas.

18. The method of claim 10, wherein the second unit comprises one or more antennas.

* * * * *